(12) United States Patent
Kurokawa et al.

(10) Patent No.: US 10,552,044 B2
(45) Date of Patent: Feb. 4, 2020

(54) STORAGE APPARATUS, DATA PROCESSING METHOD AND STORAGE SYSTEM WHEREIN COMPRESSED DATA IS READ IN PARALLEL, SAID DATA STORED IN BUFFER BY SIZE AND READ FROM SAID BUFFER, IN ORDER OF WHEN SAID DATA IS STORED IN SAID BUFFER

(71) Applicant: Hitachi, Ltd., Tokyo (JP)

(72) Inventors: Yoshiki Kurokawa, Tokyo (JP); Satoru Watanabe, Tokyo (JP); Yoshitaka Tsujimoto, Tokyo (JP); Mitsuhiro Okada, Tokyo (JP); Akifumi Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 256 days.

(21) Appl. No.: 15/124,690

(22) PCT Filed: Mar. 27, 2014

(86) PCT No.: PCT/JP2014/058771
§ 371 (c)(1),
(2) Date: Sep. 9, 2016

(87) PCT Pub. No.: WO2015/145647
PCT Pub. Date: Oct. 1, 2015

(65) Prior Publication Data
US 2017/0017395 A1      Jan. 19, 2017

(51) Int. Cl.
*G06F 12/02* (2006.01)
*G06F 3/06* (2006.01)
(Continued)

(52) U.S. Cl.
CPC ............ *G06F 3/061* (2013.01); *G06F 3/0656* (2013.01); *G06F 3/0688* (2013.01);
(Continued)

(58) Field of Classification Search
CPC combination set(s) only.
See application file for complete search history.

(56) References Cited

U.S. PATENT DOCUMENTS 5,357,614 A * 10/1994 Pattisam ............... G06F 3/0601
710/68
5,884,303 A *  3/1999 Brown .............. G06F 17/30445
707/779

(Continued)

FOREIGN PATENT DOCUMENTS

JP       2007-524923 A       8/2007

OTHER PUBLICATIONS

International Search Report of PCT/JP2014/058771 dated Apr. 22, 2014.

*Primary Examiner* — Ann J Lo
*Assistant Examiner* — Chie Yew
(74) *Attorney, Agent, or Firm* — Mattingly & Malur, PC

(57) ABSTRACT

A management controller controls a data buffer and a flash controller, which controls I/O of data to and from flash memories, based on a search request. A data decompression engine includes a plurality of data decompression circuits for decompressing, in parallel, the compressed data transferred from the data buffer. A data search engine includes a plurality of data search circuits for searching, in parallel, data which satisfies search conditions among the respective data that were decompressed by the data decompression circuits, and transfers, to the search request source, the data obtained in the search performed by the data search circuits, wherein the flash controller reads, in parallel, a plurality of compressed data requested in the search request, and transfers the read compressed data to the data buffer, and the management controller transfers the compressed data to the data decompression engine when the compressed data is stored in the data buffer.

15 Claims, 14 Drawing Sheets

(51) Int. Cl.
*G06F 16/2455* (2019.01)
*G06F 16/951* (2019.01)
(52) U.S. Cl.
CPC .... *G06F 12/0246* (2013.01); *G06F 16/24561* (2019.01); *G06F 16/951* (2019.01); *G06F 2212/401* (2013.01)

(56) References Cited

U.S. PATENT DOCUMENTS

| | | | |
|---|---|---|---|
| 2003/0041054 A1* | 2/2003 | Mao | G06F 17/30864 |
| 2005/0104753 A1* | 5/2005 | Dror | H03M 7/3086 |
| | | | 341/51 |
| 2006/0294059 A1 | 12/2006 | Chamberlain et al. | |
| 2008/0040531 A1* | 2/2008 | Anderson | G06F 11/1068 |
| | | | 710/313 |
| 2008/0052329 A1* | 2/2008 | Dodge | G06F 3/0608 |
| 2009/0201736 A1* | 8/2009 | Nguyen | G11C 16/26 |
| | | | 365/185.12 |
| 2011/0040771 A1* | 2/2011 | Gilyadov | G06F 13/385 |
| | | | 707/754 |
| 2014/0032516 A1* | 1/2014 | Sukhwani | G06F 17/30292 |
| | | | 707/705 |

* cited by examiner

STORAGE APPARATUS, DATA PROCESSING METHOD AND STORAGE SYSTEM WHEREIN COMPRESSED DATA IS READ IN PARALLEL, SAID DATA STORED IN BUFFER BY SIZE AND READ FROM SAID BUFFER, IN ORDER OF WHEN SAID DATA IS STORED IN SAID BUFFER

TECHNICAL FIELD

The present invention relates to a storage apparatus, a data processing method and a storage system having a function of storing and searching for data.

BACKGROUND ART

As an apparatus having a function of storing and searching for data, for instance, there is an apparatus including a magnetic storage device which stores target data, and a reconfigurable logical device, wherein, when the reconfigurable logical device receives a search inquiry using a data key and reads the target data from a magnetic storage medium, the match between the target data and the data key is determined (refer to PTL 1). Since this apparatus uses a magnetic storage medium as its storage medium, it is insufficient for speeding up the I/O processing of data.

Meanwhile, in recent years, proposed is a storage apparatus capable of speeding up the I/O processing of data by using a flash memory as the storage device for storing data. When a flash memory is used as the storage medium, a configuration of storing compressed data in the flash memory is adopted in order to store large volumes of data.

CITATION LIST

Patent Literature

[PTL 1] Japanese Unexamined Patent Application Publication (Translation of PCT Application) No. 2007-524923

SUMMARY OF INVENTION

Technical Problem

When a magnetic storage medium is used as the storage medium, data needs to be read sequentially in order to read data from the magnetic storage medium. Meanwhile, when a flash memory is used as the storage medium, the reading speed of data can be sped up since data can be read from the flash memory in parallel.

When processing data stored in the flash memory as the data to be searched, in order to speed up the reading speed of data, processing is executed for reading data (compressed data) from the flash memory in parallel, temporarily storing the read data (compressed data) in a data buffer (temporary storage device), subsequently decompressing the data (compressed data) retained in the data buffer, and searching for the decompressed data. Here, even if the data (compressed data) is read from the flash memory in parallel, if the data decompression/search processing is not sped up, it is not possible to quickly process the data read from the flash memory, and the processing of reading data from the flash memory becomes a bottleneck.

An object of the present invention is to provide a storage apparatus, a data processing method and a storage system capable of preventing the processing of reading data from flash memories from becoming a bottleneck.

Solution to Problem

In order to achieve the foregoing object, the present invention comprises a plurality of flash memories which store a plurality of compressed data, a flash controller which controls I/O of data to and from the flash memories, a data buffer which temporarily stores the compressed data, a management controller which controls I/O of data to and from the data buffer based on a search request from a search request source, a data decompression engine which includes a plurality of data decompression circuits for decompressing, in parallel, the compressed data transferred from the data buffer, and a data search engine which includes a plurality of data search circuits for searching, in parallel, data which satisfies search conditions requested in the search request among the respective data that were decompressed by each of the data decompression circuits, and transfers, to the search request source, the data obtained in the search performed by each of the data search circuits, wherein the flash controller reads, in parallel, a plurality of compressed data belonging to the search source data from two or more flash memories, and transfers the read compressed data to the data buffer, and the management controller transfers the compressed data to the data decompression engine each time the compressed data belonging to the search source data is stored in the data buffer.

Advantageous Effects of Invention

According to the present invention, it is possible to prevent the processing of reading data from flash memories from becoming a bottleneck.

DESCRIPTION OF EMBODIMENTS

Embodiment 1

An embodiment of the present invention is now explained with reference to the appended drawings.

Figure 1:
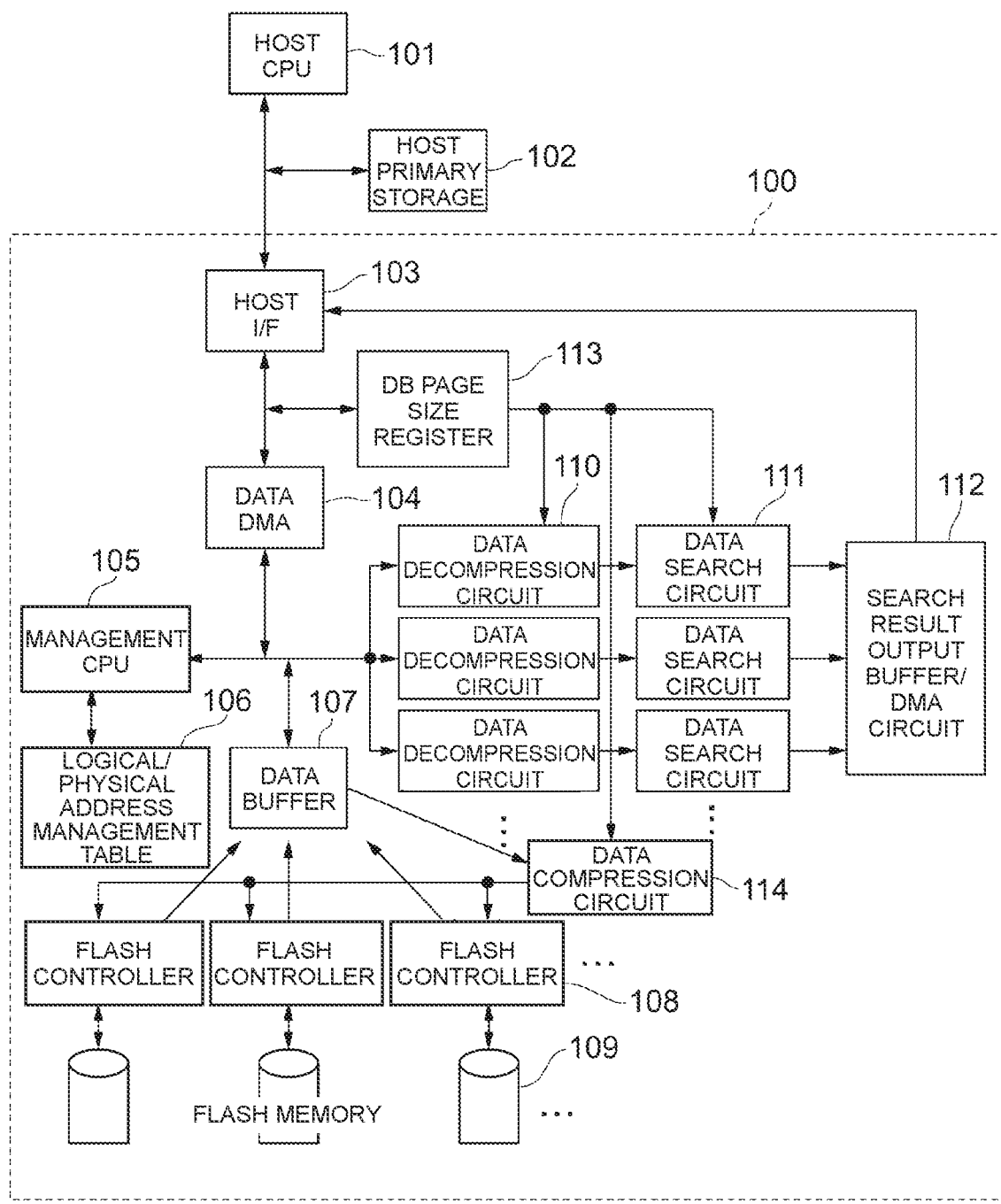
FIG. 1 is an overall configuration diagram of a storage apparatus equipped with a database assist function.

FIG. 1 is an overall configuration diagram of a storage apparatus equipped with a database assist function. In FIG. 1, a storage apparatus 100 is arranged on a board (not shown) together with a host CPU (Central Processing Unit) 101 and a host primary storage device 102.

The storage apparatus 100 is configured from a host interface (host I/F) 103, a data DMA (Direct Memory Access) circuit 104, a management CPU 105, a logical/physical address management table 106, a data buffer (DRAM) 107, a plurality of flash controllers 108, a plurality of flash memories 109, a plurality of data decompression circuits 110, a plurality of data search circuits 111, a search result output buffer/DMA circuit 112, a database (DB) page size register 113, and a data compression circuit 114.

The host CPU 101 is a host computer comprising a memory, an I/O interface and other information processing resources, and is, for example, a central processing unit on which a database application is run. By issuing, to the storage apparatus 100, an access request such as a write request, a read request or a search request designating a logical volume (logical address) provided by the storage apparatus 100, the host CPU 101 can access that logical volume. Here, the host CPU 101 is configured as an access request source or a search request source, sends and receives information to and from the host primary storage device 102, and sends and receives information to and from the storage apparatus 100 via the host interface 103. The host primary storage device 102 is configured as a primary storage area in which a database application is run.

The host interface 103 is an interface which connects the storage apparatus 100 and the host CPU 101, and becomes the interface when the host CPU 101 uses the assist function of the storage apparatus 100.

The data DMA circuit 104 sends and receives information to and from the host interface 103, the management CPU 105 and the data buffer 107, and, for example, sends and receives data to and from the host primary storage device 102 via the host interface 103 when the host CPU 101 issues a read request or a write request of data. Here, the data DMA circuit 104 reads the read data stored in the host primary storage device 102, and transfers, to the primary storage device 102, the write data read from the data buffer 107.

The management CPU 105 controls the activation of the data DMA circuit 104, the respective flash controllers 108 and the respective data decompression circuits 110, and is configured as a management controller which uses the logical/physical address management table 106 to manage the read/write operation of the respective flash controllers 108, and control the I/O of data to and from the data buffer 107.

The logical/physical address management table 106 is a table for managing the relationship of the logical address of the page data of the database managed based on the database application, and the physical address (flash memory block address) which indicates the actual storage area of the page data. The logical/physical address management table 106 is used upon converting a logical address, which was added to a read request, a write request or a search request, into a physical address when the management CPU 105 receives a read request, a write request or a search request from the host CPU 101.

The data buffer 107 is configured as a storage area for temporarily storing the compressed data read from the flash memory 109 and the compressed data to be stored in the flash memory 109.

Each flash controller 108 sends and receives data to and from the data buffer 107, and controls the I/O of data to and from each flash memory 109.

Each flash memory 109 is configured as a block write/erase type storage device including a plurality of blocks as the storage area of data. Data is written into each flash memory 109 in block units and data is erased from each flash memory 109 in block units. The writing of data into and the erasure of data from each flash memory 109 are managed by the management CPU 105. Furthermore, each block of the flash memory 109 stores, for each page unit, compressed data which is obtained by compressing data in which the data size before data compression is managed in page units of the database, for example, if the page unit is set to be 8 KB, data which is managed at a capacity of 8 KB or less.

The database page size register 113 is a register for storing information related to the page size of the database as information which is set by the host CPU 101. Note that the database page size register 113 may also store information, such as a search key, a comparison key or search conditions, to be added to the search request issued from the host CPU 101.

The data compression circuit 114 is used upon writing data into the flash memory 109, and data that is temporarily stored in the data buffer 107 is subject to compression processing, and then written into the flash memory 109 via the flash controller 108. Here, data compression is performed by using the value of the DB page size register 113 to decide the size of the unit in which the data is to be compressed. As a result of performing compression based on the value of the DB page size register 113, the data decompression circuit 110 can subsequently decompress data in DB page units when reading data.

Each data decompression circuit 110 retrieves the compressed data from the data buffer 107, and decompresses the retrieved compressed data according to the information stored in the database page size register 113. In other words, each data decompression circuit 110 decompresses the compressed data in decompression units corresponding to page units (decompression units=page units), which are the units in which the data was compressed by the data compression circuit 114, and transfers the decompressed data to each data search circuit 111 as the data in page units.

Each data search circuit 111 searches for data to be searched according to the search conditions stored in the database page size register 113 with the decompressed data transferred from each data decompression circuit 110, and which are data in page units, as the data to be searched, searches for data which satisfies the search conditions among the data in page units, and transfers the search result to the search result output buffer/DMA circuit 112. Note that information such as search conditions to be added to the search request (request) issued by the host CPU 101 may also be retained in a register that is different from the database page size register 113.

The search result output buffer/DMA circuit 112 executes a DMA operation of compiling the search results of each data search circuit 111 and transferring the compiled contents to the host primary storage device 102 via the host interface 103, and transferring, to the host primary storage device 102, the processing result of the database application running on the host CPU 101.

The operation of writing data of the database into the flash memory 109 is foremost explained. Prior to starting the write processing to the storage apparatus 100, the host CPU 101 sets information of the page size of the database, which is managed with the database application, in the database page size register 113 via the host interface 103. When the management CPU 105 receives a write request from the host CPU 101, the management CPU 105 stores, in the data buffer 107, data of the database to be received subsequently. The management CPU 105 compresses the stored database page data with the data compression circuit 114 and gives write an instruction to each flash controller 108, and the compressed data is written into the flash memory 109. Here, the data compression circuit divides data into each page size that is set in the database page size register 113, and then compresses and stores the divided data. The compressed and stored data become the data to be decompressed into the page sizes set in the database page size register when they are read.

The search operation using the foregoing compressed data is now explained. Prior to starting the search processing to the storage apparatus 100, the host CPU 101 sets information of the page size of the database, which is managed with the database application, in the database page size register 113 via the host interface 103, and thereafter sends a search request (request) including the logical address, search conditions and the like to the management CPU 105 via the host interface 103 and the data DMA circuit 104. Here, the host CPU 101 may also set, in the database page size register 113, information to be added to the search request such as a search key, a comparison key, and search conditions.

When the management CPU 105 receives a search request from the host CPU 101, the management CPU 105 activates each flash controller 108 and gives an instruction to each flash controller 108 to read a plurality of compressed data belonging to the search source data which was requested in the search request. Each flash controller 108 reads, in parallel, the plurality of compressed data belonging to the search source data according to the instruction given by the management CPU 105 from two or more flash memories among the plurality of flash memories 109, transfers the read compressed data to the data buffer 107, and sequentially stores the respective compressed data in the data buffer 107.

Subsequently, each time the respective compressed data read from the respective blocks of each flash memory 109 are stored in the data buffer 107, the management CPU 105 sequentially transfers, to one of the data decompression circuits 110, the respective compressed data stored in the data buffer 107, irrespective of the reading order. Each data decompression circuit 110 decompresses the compressed data transferred from the data buffer 107 in decompression units, and sequentially transfers the decompressed data to the data search circuit 111 as data in page units. Each data search circuit 110 searches for data to be searched according to the search conditions with the decompressed data transferred from each data decompression circuit 110, and which are data in page units, as the data to be searched, and transfers the search result of the data in page units to the search result output buffer/DMA circuit 112. The search result output buffer/DMA circuit 112 compiles the search results of each data search circuit 111 and transfers the compiled contents to the host primary storage device 102 via the host interface 103.

The size before compression of the compressed data stored in the respective blocks of the flash memory 109 is the page unit of the database, and because the decompression unit of each data decompression circuit 110 is set to be a unit corresponding to the page unit of the database, even if the compressed data is read from the data buffer 107 in random order upon decompressing the respective compressed data belonging to the search source data with each data decompression circuit 110, it is possible to execute the decompression processing to the read compressed data in the order that the reading of the compressed data is completed, and process the decompressed data, which are data in page units, as the data to be searched. Thus, it is possible to speed up the decompression processing of the read compressed data even when the respective compressed data belonging to the search source data are read from the data buffer 107 in random order, as well as cause the data in page units to be the data to be searched even when the decompressed data are to be the data to be searched, and it is thereby possible to speed up the search processing of the data to be searched.

Figure 2:
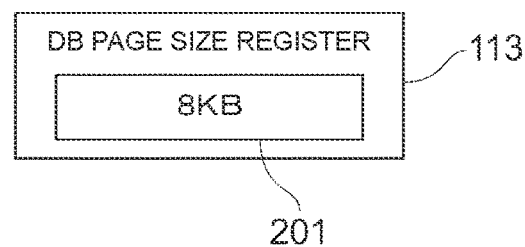
FIG. 2 is a configuration diagram of a database page size register.

FIG. 2 is a configuration diagram of a database page size register. In FIG. 2, the database page size register 113 is configured as a register for storing a set value 201 that is set by the host CPU 101. The set value 201 stores, for example, a value of 8 KB when the host CPU 101 sets 8 KB as the page size of the database, and information indicating the page size of the database, and which is the page unit (information of the decompression unit corresponding to the page unit). Moreover, the database page size register 113 stores information such as the search conditions included in the search request. Here, the database page size register 113 configures a first register for storing information which is set by the host CPU 101 (search request source) and which is information of the decompression unit corresponding to the page unit, and a second register for storing information to be added to the search request from the host CPU 101 (search request source) and which is information indicating the search conditions requested in the search request.

Figure 3:
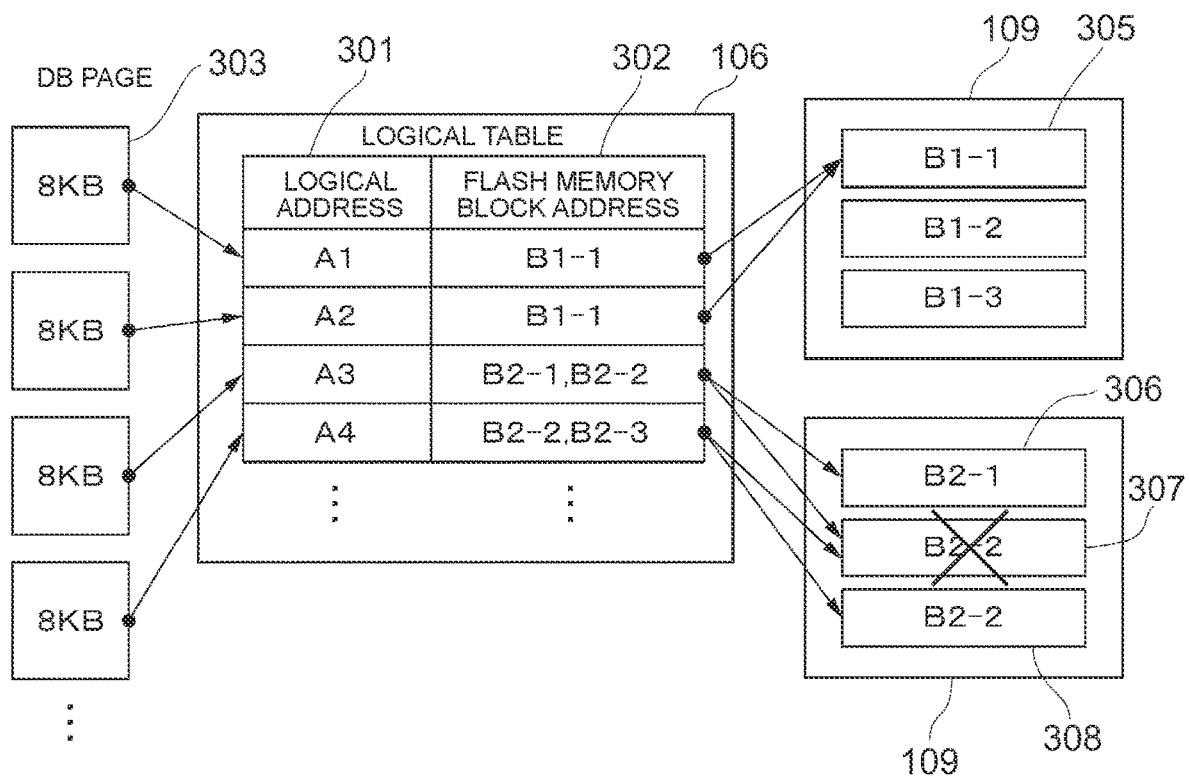
FIG. 3 is an explanatory diagram explaining the configuration of a logical/physical address management table.

FIG. 3 is an explanatory diagram explaining the configuration of a logical/physical address management table. In FIG. 3, the logical/physical address management table 106 is configured from a logical address field 301 and a flash memory block address field 302, and stored in a memory (not shown) which is managed by the management CPU 105.

The logical address is an address for identifying page data 303 of the database, and the logical address field 301 stores information (A1 to A4, . . . ) related to the identifier for identifying the page data 303 of the database. Note that the page data 303 is configured, for example, as data in page units at a capacity of 8 KB or less.

The flash memory block address is an address for identifying the blocks (data storage areas) 305 to 308 formed in the flash memory 109. The flash memory block address field 302 stores information (B1•1, B2•1, B2•2, B2•3, . . . ) related to the block address for identifying the blocks 305 to 308 of the flash memory 109.

Meanwhile, the respective blocks 305 to 308 of the flash memory 109 store, for each page unit, the compressed data which were obtained by compressing data in which the data size before data compression is managed in page units. For example, the page data 303 of the logical address A1 and the page data 303 of the logical address A2 are respectively stored in the block 305 of the flash memory 109. Moreover, the page data 303 of the logical address A3 is stored in the block 306, and the page data 303 of the logical address A4 is stored in the block 308. In other words, the page data 303 of the logical address A3 is prohibited from being stored across the block 306 and the block 307, and the page data 303 of the logical address A4 is prohibited from being stored across the block 307 and the block 308. This is in order to prevent the data management from becoming complicated and causing performance deterioration in the reclamation operation, which is an operation that is unique to the flash memory 109. Note that the respective blocks 305 to 308 may also store, for each page unit, the compressed data of an integral multiple of the page data 303 of the database.

Figure 4:
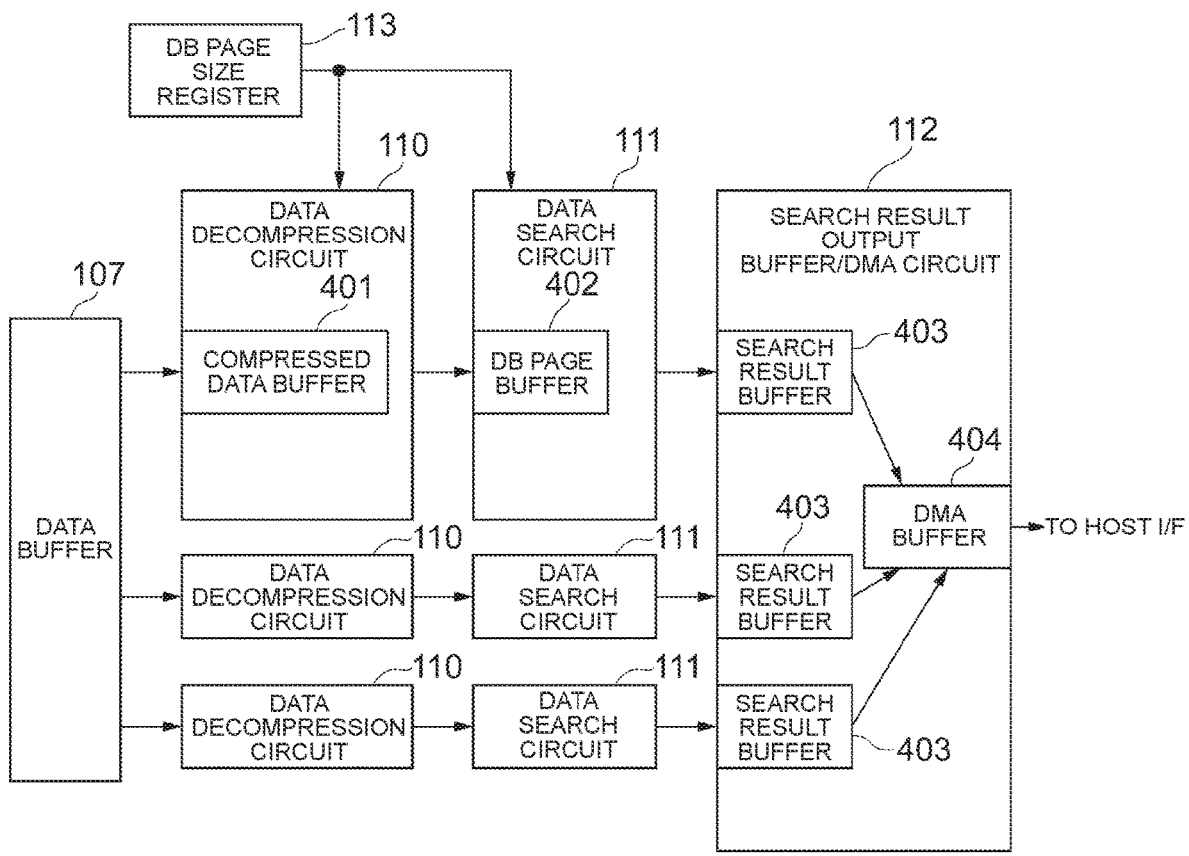
FIG. 4 is a configuration diagram of a data decompression engine and a data search engine.

FIG. 4 is a configuration diagram of a data decompression engine and a data search engine. In FIG. 4, the data decompression engine is configured from a plurality of data decompression circuits 110, and the data search engine is configured from a plurality of data search circuits 111 and a search result output buffer/DMA circuit 112.

Each data decompression circuit 110 comprises a compressed data buffer 401 for temporarily retaining the compressed data transferred from the data buffer 107. The compressed data buffer 401 can store one or more pages worth of compressed data obtained by compressing the page data 303. Thus, even when a plurality of compressed data are read from the data buffer 107 in parallel, the respective compressed data can be sequentially stored in each compressed data buffer 401, and it is thereby possible to prevent the data buffer 107 from becoming a bottleneck. Moreover, each data decompression circuit 110 determines the consistency of a plurality of check codes, for instance, a header check code part and a footer check code part, to be added to the decompressed data upon decompressing the compressed data, and transfers the decompressed data to each data search circuit 111 on the condition that there is consistency, and prohibits the transfer of the decompressed data when there is no consistency.

Each data search circuit 111 comprises a database (DB) page buffer 402 for storing, for each page unit, data in page units which were decompressed by each data decompression circuit 110. Each data search circuit 111 searches for data which satisfies the search conditions among the data to be searched with the data in page units stored in the database page buffer 402 as the data to be searched, and transfers, to the search result output buffer/DMA circuit 112, the data obtained in the search as the search result.

The search result output buffer/DMA circuit 112 comprises a search result buffer 403 for storing the search result of each database search circuit 111, and additionally comprises a DMA buffer 404 for retrieving and storing the contents stored in each search result buffer 403. The contents of the search result stored in the DMA buffer 404 are sent from the DMA buffer 404 to the host primary storage device 102 via the host interface 103 through DMA.

Figure 5:
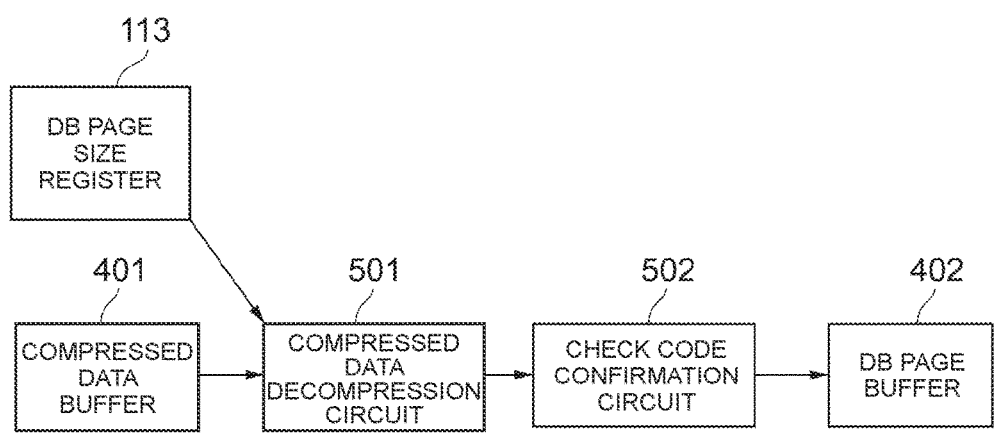
FIG. 5 is a diagram explaining the configuration of a data decompression circuit.

FIG. 5 is a diagram explaining the configuration of a data decompression circuit. In FIG. 5, the data decompression circuit 110 is configured from a compressed data buffer 401, a compressed data decompression circuit 501 and a check code confirmation circuit 502, and the compressed data decompression circuit 501 is connected to the database page size register 113 and the compressed data buffer 401, and the check code confirmation circuit 502 is connected to the database page buffer 402 of the data search circuit 111.

When the compressed data in decompression units are transferred from the compressed data buffer 401, the compressed data decompression circuit 501 decompresses the compressed data according to the page unit set in the database page size register 113, and processes the decompressed data as data in page units. The compressed data decompression circuit 501 is a circuit for decompressing lossless compressed data, and the LZ method may be adopted as the compression method.

The check code confirmation circuit 502 confirms the consistency of the decompressed data, and, when the data have consistency and are authentic, adds a message to such effect to the decompressed data and transfers the decompressed data to the database buffer 402. Here, the check code confirmation circuit 502 confirms, as described later, the consistency of the header check code part and the footer check code part of the database page which is prescribed in a database page format.

Figure 6:
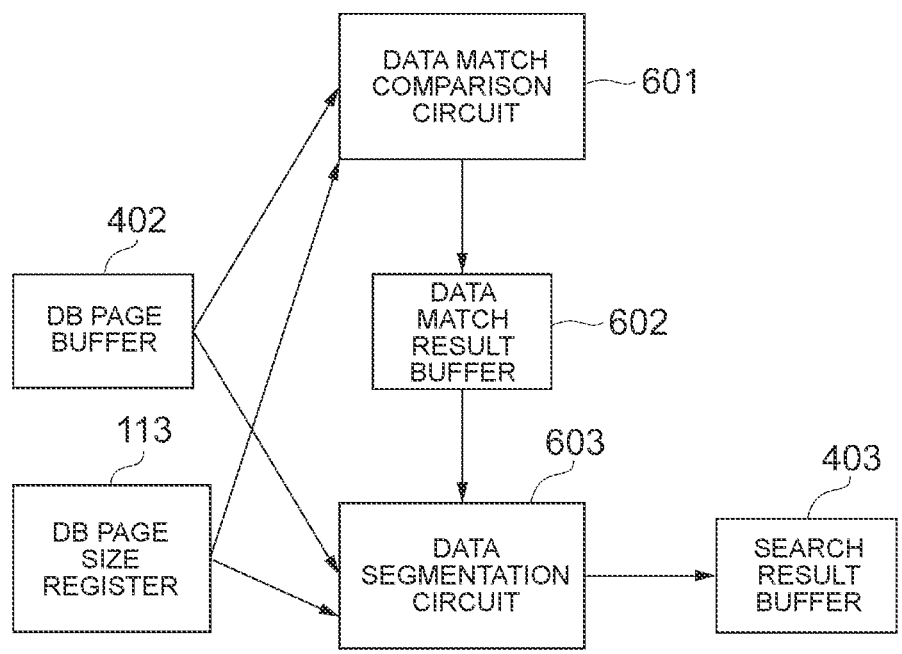
FIG. 6 is a diagram explaining the configuration of a database data search circuit.

FIG. 6 is a diagram explaining the configuration of a database data search circuit. In FIG. 6, the data search circuit 111 is a circuit for searching for the data of the database, and is configured from a database page buffer 402, a data match comparison circuit 601, a data match result buffer 602 and a data segmentation circuit 603. The data match comparison circuit 601 is connected to the database page buffer 402 and the database page size register 113, and the data segmentation circuit 603 is connected to the database page buffer 402, the database page size register 113, and the search result buffer 403 of the search result output buffer/DMA circuit 112.

The data match comparison circuit 601 retrieves as the data to be searched, from the database page buffer 402, the decompressed data which are data in page units, retrieves, from the database page size register 113, information of the search key added to the search request, refers to the data to be searched for each line, determines for each line whether data that matches the search key exists in the data to be searched, and stores the matched data in the data match result buffer 602 in cases where matched data exists in the data of each line.

The data segmentation circuit 603 retrieves as the data to be searched, from the database page buffer 402, the data in page units, retrieves information of the search key from the database page size register 113, refers to the data of each line stored in the data match result buffer 602, segments the data of the column which matches the search key among the data of each line, and transfers the data of the segmented column to the search result buffer 403 as the data of the search result.

Figure 7:
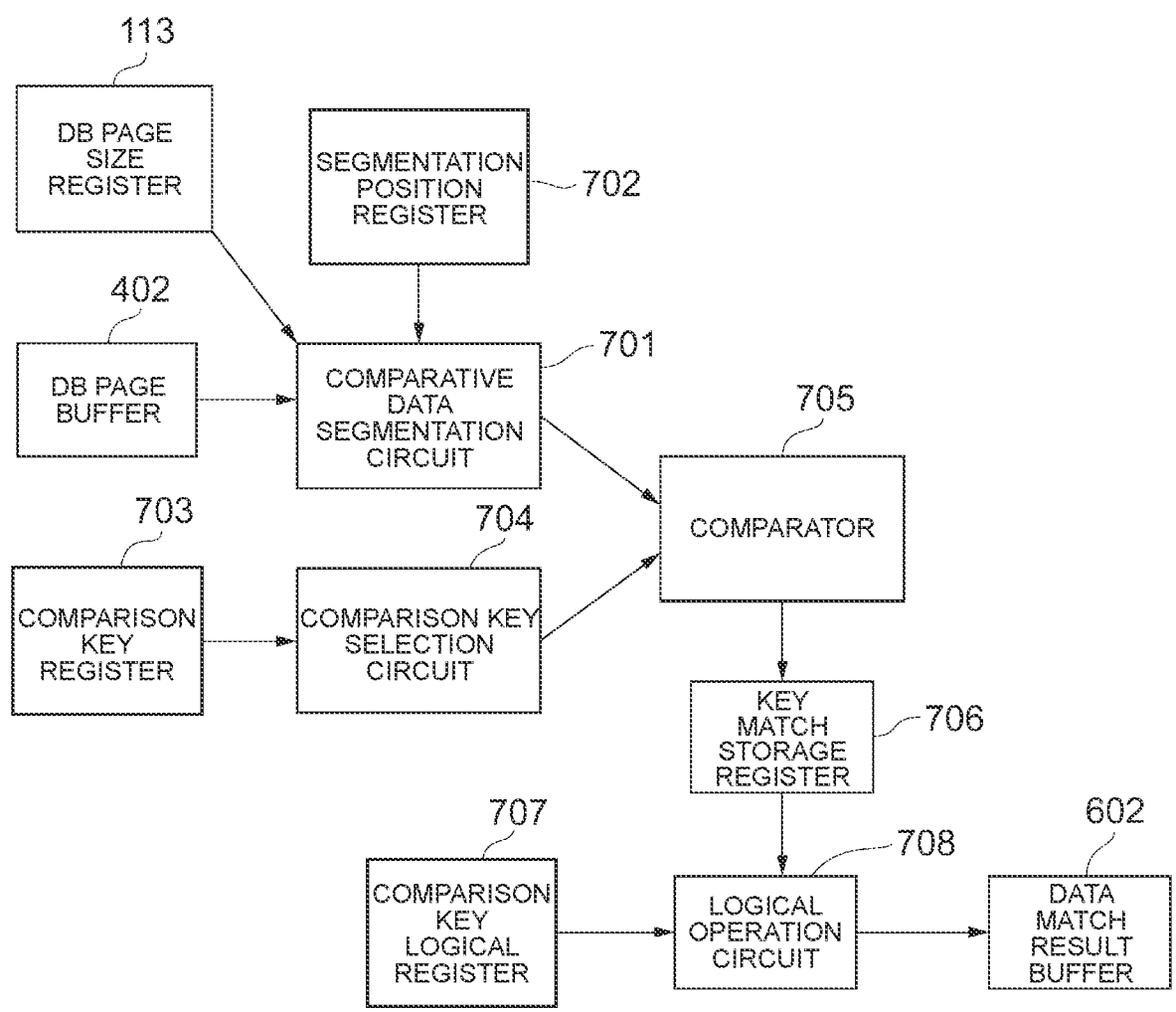
FIG. 7 is a diagram explaining the configuration of a data match comparison circuit.

FIG. 7 is a diagram explaining the configuration of a data match comparison circuit. In FIG. 7, the data match comparison circuit 601 is configured from a comparative data segmentation circuit 701, a segmentation position register 702, a comparison key register 703, a comparison key selection circuit 704, a comparator 705, a key match storage register 706, a comparison key logical register 707, and a logical operation circuit 708. The comparative data segmentation circuit 701 is connected to the database page size register 113 and the database page buffer 402, and the logical operation circuit 708 is connected to the data match result buffer 602 of the data search circuit 111.

In FIG. 7, the segmentation position register 702 stores information (information of the segmentation position) of the position of the comparison target section to be segmented among the data of the database (database data) which are being managed in page units. The comparative data segmentation circuit 701 retrieves the set value of the page unit from the database page size register 113, retrieves, from the database page buffer 402, the decompressed data, which are data in page units, as the data to be searched, segments the data of the comparative target section which was set in the segmentation position register 702, and which is data of the comparative target section existing in each line, among the data to be searched in page units, and transfers the segmented data to the comparator 705.

Meanwhile, the comparison key register 703 stores information such as the comparison key (data key) and the comparison conditions (match, size, etc.) among the information that was added to the search request. The comparison key selection circuit 704 selects the comparison key and the comparison conditions to be used by the comparator 705 from the comparison key register 703, and transfers information of the selected comparison key and comparison conditions to the comparator 705.

The comparator 705 compares the data transferred from the comparative data segmentation circuit 701 (data of the comparative target section existing in each line) and the comparison key and the comparison conditions transferred from the comparison key selection circuit 704, and stores, in the key match storage register 706, the data which matches the comparison key and satisfies the comparison conditions as the data of the comparison result among the data of the comparative target section existing in each line.

The comparison key logical register 707 stores information of a logical formula to be used in the logical operation circuit 708, for example, information of AND, OR and the like. The logical operation circuit 708 retrieves the data stored in the key match storage register 706, performs a logical operation using the logical formula stored in the comparison key logical register 707, extracts data which satisfies the logical formula among the data stored in the key match storage register 706, and transfers the extracted data to the data match result buffer 602 as the data indicating the comparison result of a match.

Figure 8:
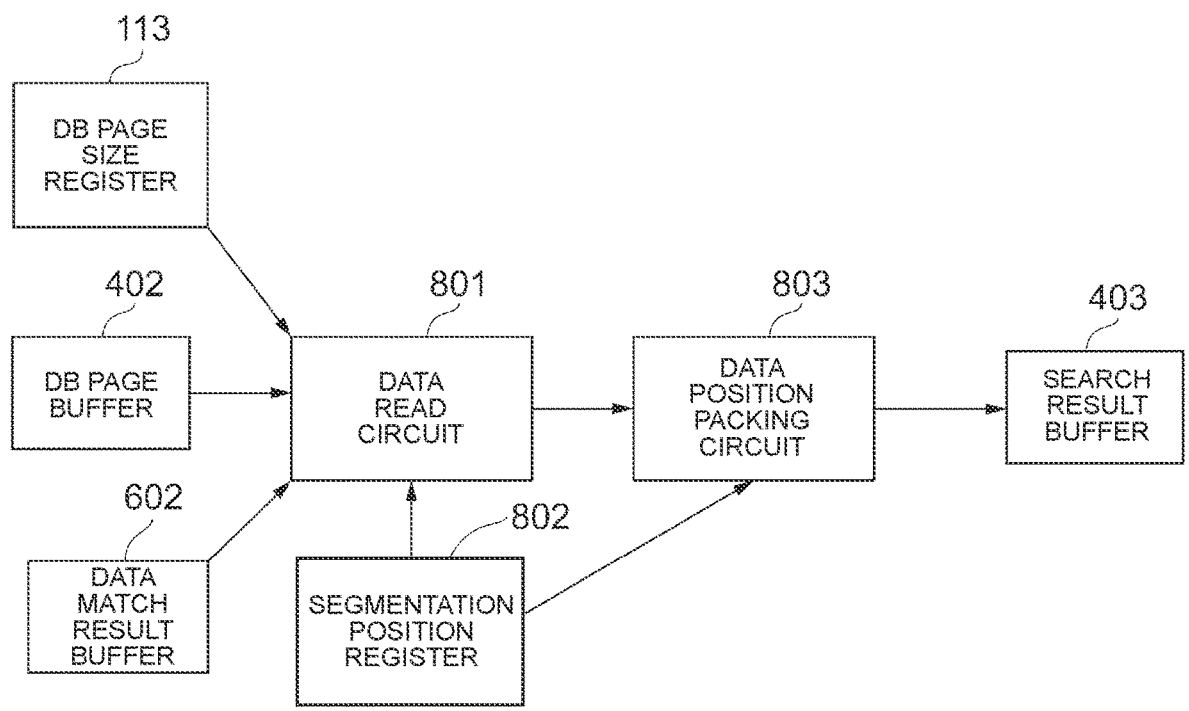
FIG. 8 is a diagram explaining the configuration of a data segmentation circuit.

FIG. 8 is a diagram explaining the configuration of a data segmentation circuit. In FIG. 8, the data segmentation circuit 603 is configured from a data read circuit 801, a segmentation position register 802, and a data position packing circuit 803. The data read circuit 801 is connected to the database page size register 113, the database page buffer 402 and the data match result buffer 602, and the data position packing circuit 803 is connected to the search result buffer 403 of the search result output buffer/DMA circuit 112.

In FIG. 8, the segmentation position register 802 stores information indicating the segmentation position of the data to be used by the data read circuit 801. The data read circuit 801 retrieves information of the set value 201 indicating the page unit from the database page size register 113, additionally retrieves the decompressed data, which are data in page units, from the database page buffer 402, further retrieves the data indicating the comparison result of the data match comparison circuit 601 (hit data indicating the match comparison result) from the data match result buffer 602 of the data search circuit 111, reads the data of the segmentation position of the data set in the segmentation position register 802 among the data retrieved from the data match result buffer 602, and transfers the read data to the data position packing circuit 803. The data position packing circuit 803 sequentially performs the position packing of the data transferred from the data read circuit 801 according to the segmentation position of the data set in the segmentation position register 802, and transfers the position-packed data to the search result buffer 403 as the data of the search result.

Figure 9:
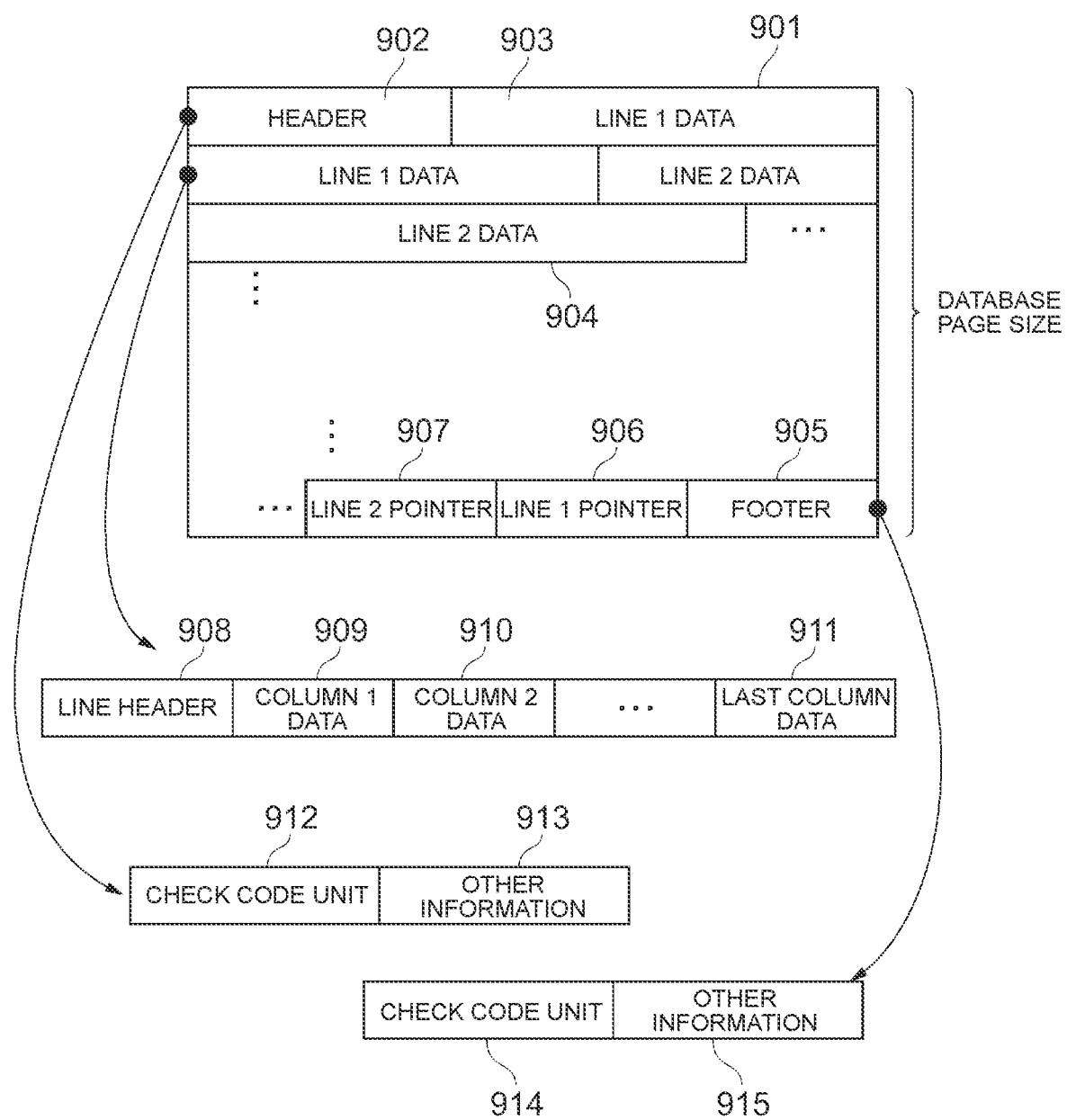
FIG. 9 is a configuration diagram of a database page format.

FIG. 9 is a configuration diagram of a database page format. In FIG. 9, the database page format is a format which prescribes the structure for storing data in pages units, for example, data having a capacity of 8 KB or less (page data 303 of the database), in the database page 901. The database page 901 is configured from a database page header 902, a line 1 data 903, a line 2 data 904, . . . , a database page footer 905, a line 1 pointer 906, a line 2 pointer 907 . . . .

The line 1 data 903 is configured from a line header 908, a column 1 data 909, a column 2 data 910, . . . , and a last column data 911. The database page header 902 is configured from a header check code part 912, and header and other information 913. The database page footer 905 is configured from a footer check code part 914, and footer and other information 915.

Figure 10:
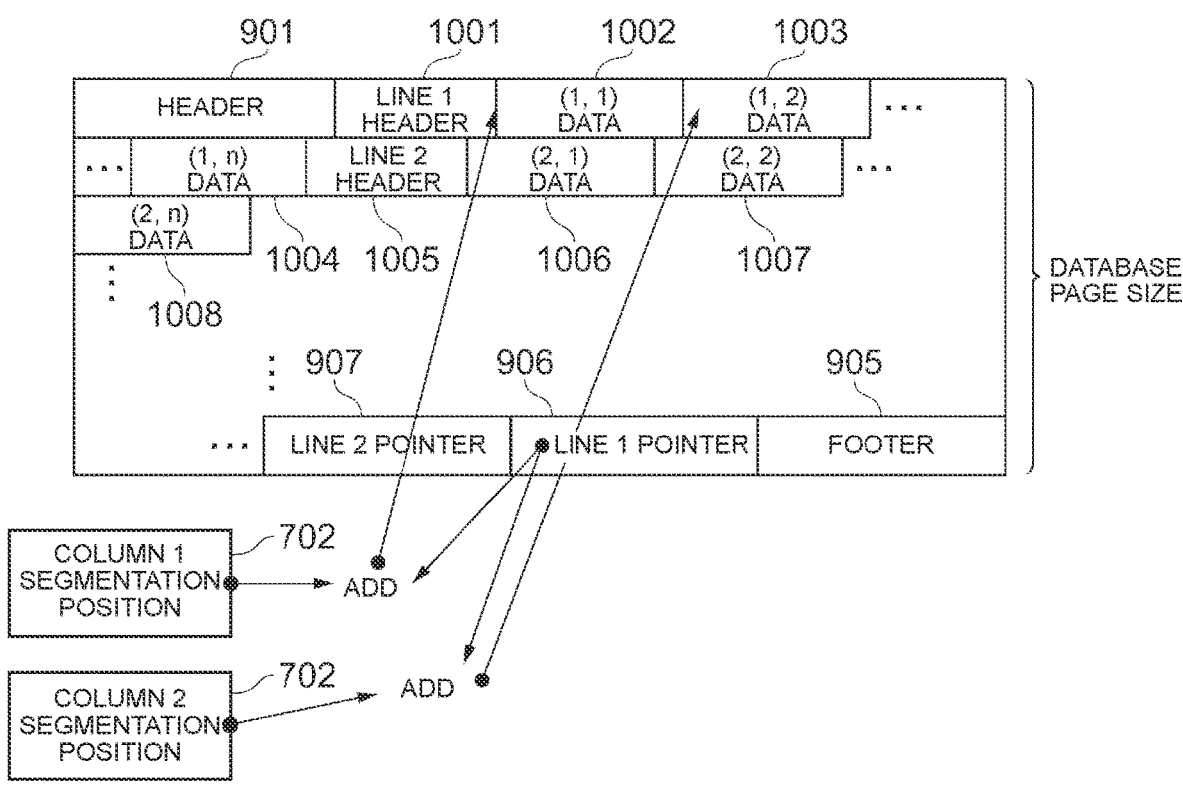
FIG. 10 is an explanatory diagram explaining the read processing of comparative data based on a database page format.

FIG. 10 is an explanatory diagram explaining the read processing of comparative data based on a database page format. In FIG. 10, when reading data in page units, the data search circuit 111 calculates the position of the line header as the line pointer that is adjacent to the database page footer 905 by using, for example, the addresses stored in the line 1 pointer 906 and the line 2 pointer 907, adds the foregoing calculated value and the offset of each column (address indicating the segmentation position of each column) stored in the segmentation position register 702, calculates the address of the read destination based on the foregoing added value, and reads the data of the column identified with the calculated read destination address for each line.

For example, the data search circuit 111 adds the address stored in the line 1 pointer 906 and the offset of the column 1 segmentation position stored in the segmentation position register 702, calculates the address of the read destination from the added value, and reads the line 1, column 1 data 1002 as the data that is identified with the calculated read destination address. Moreover, the data search circuit 111 adds the address stored in the line 1 pointer 906 and the offset of the column 2 segmentation position stored in the segmentation position register 702, calculates the address of the read destination from the added value, and reads the line 1, column 2 data 1003 as the data that is identified with the calculated read destination address.

Figure 11:
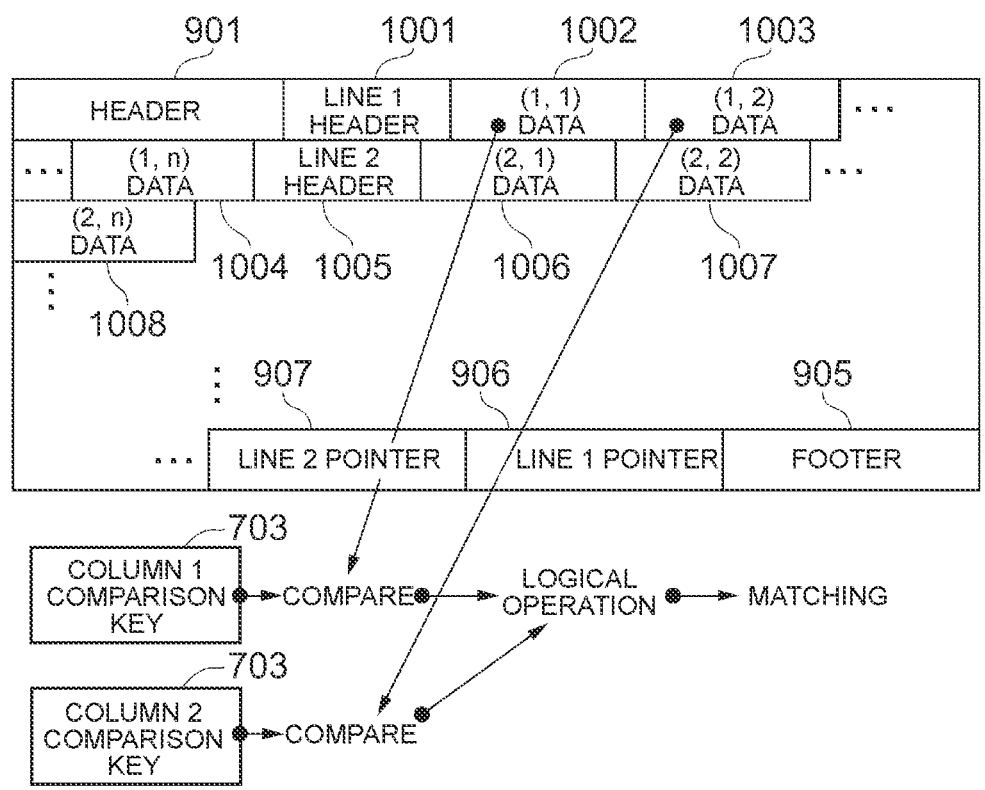
FIG. 11 is an explanatory diagram explaining the procedure for comparing the database page data and the comparison key based on a database page format.

FIG. 11 is an explanatory diagram explaining the procedure for comparing the database page data and the comparison key based on a database page format. In FIG. 11, when comparing the read data (page data 303 of the database) and the comparison key after the column data of each line has been read in the comparative data read processing, the data search circuit 111, for example, compares the line 1, column 1 data 1002 and the column 1 comparison key stored in the comparison key register 703, and performs a logical operation to the line 1, column 1 data 1002 based on the logical formula stored in the comparison key logical register 707 when the contents of the line 1, column 1 data 1002 and the column 1 comparison key are a match, or when data which coincides with the comparison key exists in the line 1, column 1 data 1002.

Subsequently, when data which satisfies the logical formula exists in the line 1, column 1 data 1002, the data search circuit 111 determines that it is a match, and transfers the line 1, column 1 data 1002 to the data match result buffer 602. The data search circuit 111 performs this processing separately for each column, and transfers the comparison result of each column to the data match result buffer 602.

Figure 12:
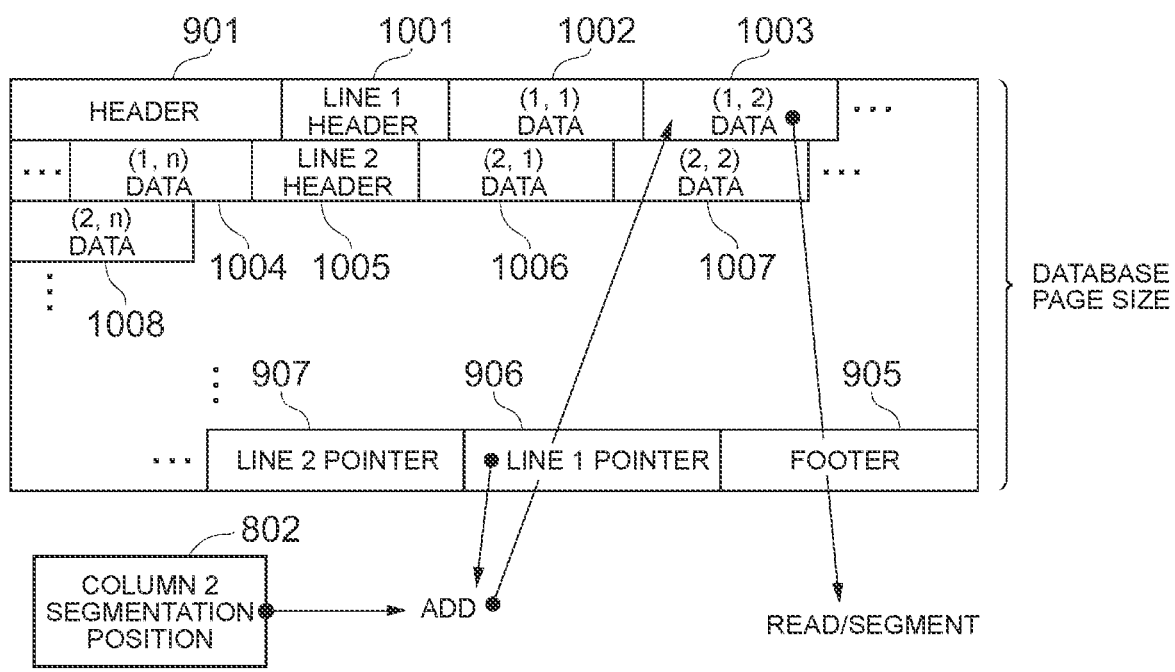
FIG. 12 is an explanatory diagram explaining the data segmentation procedure based on a database page format.

FIG. 12 is an explanatory diagram explaining the data segmentation procedure based on a database page format. In FIG. 12, when it is determined that data which satisfies the search conditions exists in the line 1, column 1 data among the data existing in the page data of the database, the data search circuit 111 executes processing for reading the data of line 1, column 2. Here, the data search circuit 111 adds the address stored in the line 1 pointer 906 and the address indicating the column 2 segmentation position stored in the segmentation position register 802 to calculate the top address indicating the data read destination, reads the data of the line 1, column 2 data 1003 as the data that is identified with the calculated address, and processes the read data as the data that was segmented from the data match result buffer 602.

As a result of repeating the processing shown in FIG. 10 to FIG. 12, it is possible to read the data of each line and each column which coincides with the search conditions among the page data 303 of the database, which are data in page units.

Figure 13:
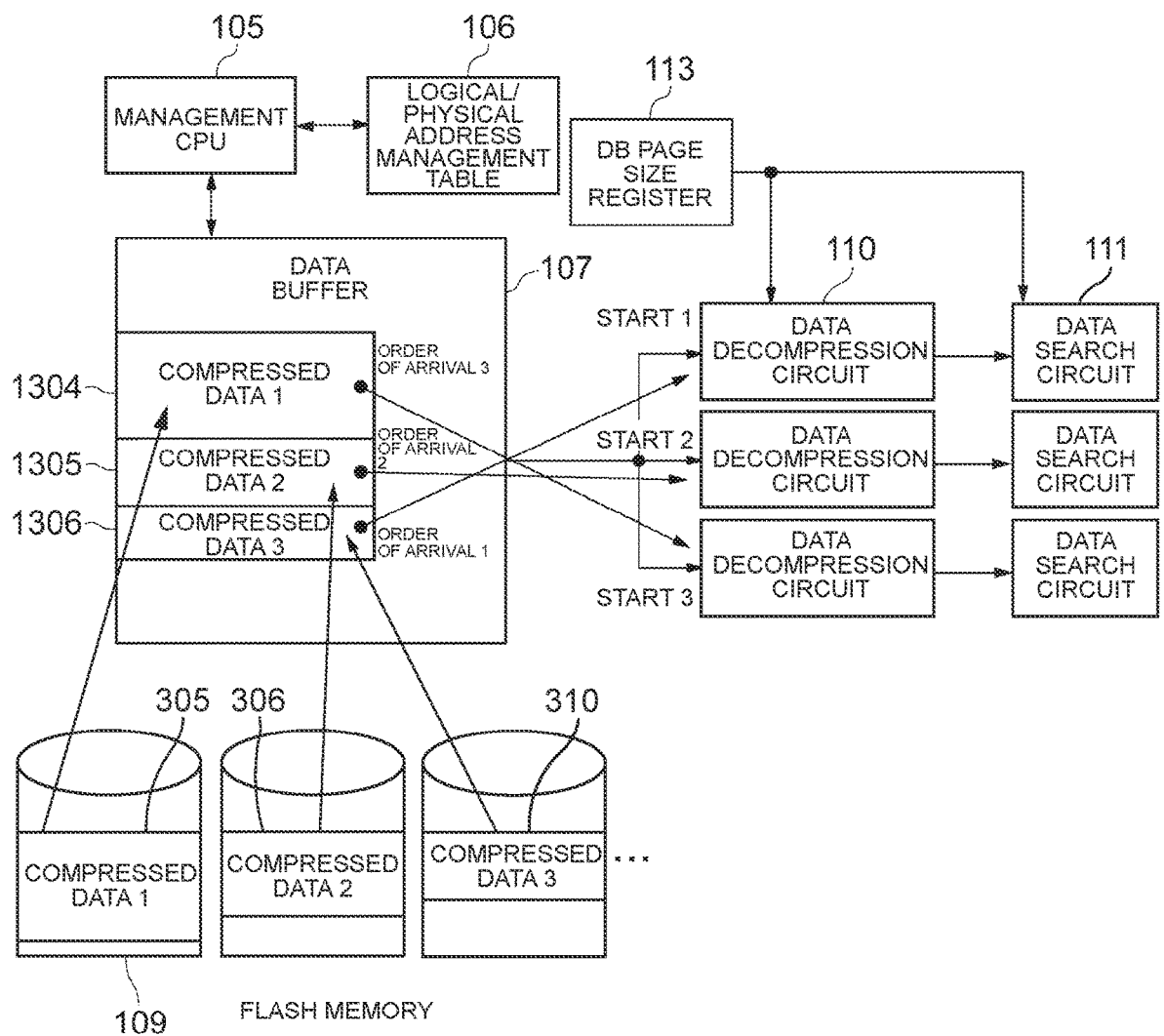
FIG. 13 is an explanatory diagram explaining the parallel reading of compressed data.

FIG. 13 is an explanatory diagram explaining the parallel reading of compressed data. In FIG. 13, in cases where compressed data 1, 2, 3 having different data sizes after compression are respectively stored in blocks 305, 306, 310 of three flash memories 109, the parallel reading of the compressed data 1, 2, 3 into the data buffer 107 is not dependent on the data size after compression, and the read processing of the compressed data 1, 2, 3 is started simultaneously.

Here, the compressed data 1, 2, 3 are each sequentially stored in the data storage areas 1304, 1305, 1306 of the data buffer 107 by the flash controller 108. With regard to the data size after compression, the compressed data 1 is the largest, the compressed data 2 is the second largest, and the compressed data 3 is the smallest. Thus, after the compressed data 3 is entirely stored in the data storage area 1306, the compressed data 2 is then entirely stored in the data storage area 1305, and the compressed data 1 is thereafter entirely stored in the data storage area 1304. In other words, the compressed data is stored in the respective data storage areas in order from the compressed data having the smallest data size after compression.

Here, since the data size after compression is different, even when the flash controller 108 reads, in parallel, the compressed data 1, 2, 3 from each flash memory 109, the time required for entirely restoring the respective compressed data 1, 2, 3 in the data buffer 107 will differ. Nevertheless, the management CPU 105 sequentially transfers, to one of the data decompression circuit 110, the compressed data read into the data buffer 107 in the order of its arrival (order that the compressed data is entirely stored), and activates each data decompression circuit 110 to which the compressed data was transferred.

The management CPU 105 monitors whether the compressed data, including data in page units, have been entirely stored in one of the data storage areas 1304, 1305, 1306 of the data buffer 107, transfers, to one of the data decompression circuits 110, the compressed data in the data storage area where the compressed data, including data in page units, have been entirely stored, on the condition that the compressed data, including data in page units, have been entirely stored in one of the data storage areas, and activates data decompression circuit 110 to which the compressed data was transferred.

For example, the management CPU 105 foremost transfers the compressed data 3 in the data storage area 1306 to the data decompression circuit 110, thereafter transfers the compressed data 2 in the data storage area 1305 to the data decompression circuit 110, and finally transfers the compressed data 1 in the data storage area 1304 to the data decompression circuit 110. Each data decompression circuit 110 decompresses the transferred compressed data, and transfers the decompressed data to the data search circuit 111 as the data in page units.

As described above, since the compressed data, including data in page units, are stored in the data buffer 107 upon reading, in parallel, a plurality of compressed data 1, 2, 3 having a different data size after compression and storing the read compressed data in the data buffer 107, and decompressing the respective compressed data 1, 2, 3 stored in the data buffer 107 with each data decompression circuit 110 according to the decompression unit, even if the compressed data stored in the data buffer 107 is transferred to the data decompression circuit 110 in order without determining whether the data to be searched, which are data in search units, have been entirely stored in the data buffer 107, the data decompression circuit 110 can transfer the decompressed data to the data search circuit 111 as the data in page units by decompressing the transferred compressed data in decompression units, and the data search circuit 111 can search the data to be searched with the data in page units as the data to be searched; that is, with the data in page units as the data to be searched and as the data in search units.

According to this embodiment, since the compressed data which were read in parallel from the flash memory 109 into the data buffer 107 are retrieved by each data decompression circuit 110, the compressed data is decompressed in parallel by each data decompression circuit 110, and the decompressed data is searched in parallel by each data search circuit 111, it is possible to prevent the processing of reading the compressed data from the flash memory 109 from becoming a bottleneck, and consequently speed up the data decompression/search processing of the data requested in the search request. Moreover, upon storing for each page unit, in the flash memory 109, the compressed data obtained by compressing the data in which the data size before compression is the page unit as the search source data and reading the data requested in the search request from the flash memory 109, since the compressed data is read in parallel from the flash memory 109 into the data buffer 107, the respective read compressed data are decompressed by each data decompression circuit 110 in decompression units corresponding to page units, the decompressed data is managed in page units, and each data search circuit 111 manages the data to be searched based on the data in page units, it is possible to speed up the data decompression search processing of the data requested in the search request since there is no need to determine whether the data to be searched have entirely been stored in the data buffer 107. In other words, since the decompression unit of each data decompression circuit 110 is set to a unit corresponding to the page unit of the database, even if the compressed data is read from the data buffer 107 in random order upon decompressing the respective compressed data belonging to the search source data with each data decompression circuit 110, it is possible to execute the decompression processing of the read compressed data in the order that the reading of the compressed data is completed, and process the decompressed data, which are data in page units, as the data to be searched. Thus, it is possible to speed up the decompression processing of the read compressed data even when the respective compressed data belonging to the search source data are read from the data buffer 107 in random order, as well as speed up the search processing of the data to be searched.

Moreover, according to this embodiment, since the blocks 305 to 308 of each flash memory 109 store the page data 303 for each page unit and the page data 303 is not stored across a plurality of blocks, it is possible to prevent the data management from becoming complicated and causing performance deterioration in the reclamation operation, which is an operation that is unique to the flash memory 109.

Embodiment 2

Figure 14:
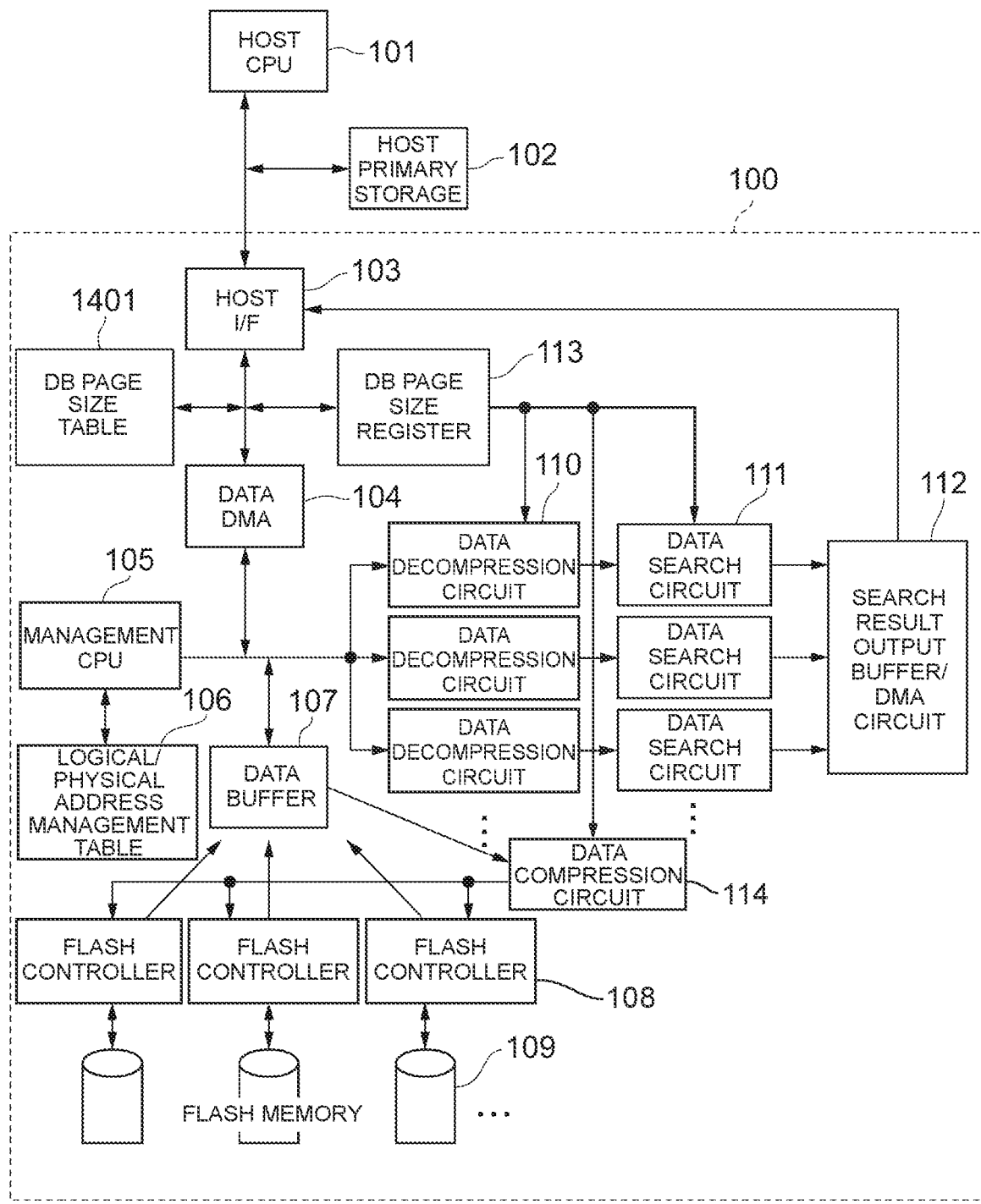
FIG. 14 is an overall configuration diagram showing Embodiment 2 of a database assisted storage apparatus.

FIG. 14 is an overall configuration diagram showing Embodiment 2 of a database assisted storage apparatus. In FIG. 14, the storage apparatus 100 in this embodiment is configured by additionally comprising a database page size table 1401, and the remaining configuration is the same as Embodiment 1. Note that the blocks of each flash memory 109 store a plurality of compressed data of different page sizes (page units).

In FIG. 14, the database page size table 1401 is a table for storing information related to the page size of the database, and is a table for associating and managing the area of the logical address (area address) which is managed by the logical/physical address management table 106, and the page size which is set in the database page size register 113. Information recorded in the database page size table 1401 is managed by the management CPU 105, and the data decompression circuit 110, the data search circuit 111 and the data compression circuit 114 are used upon processing the data.

Figure 15:
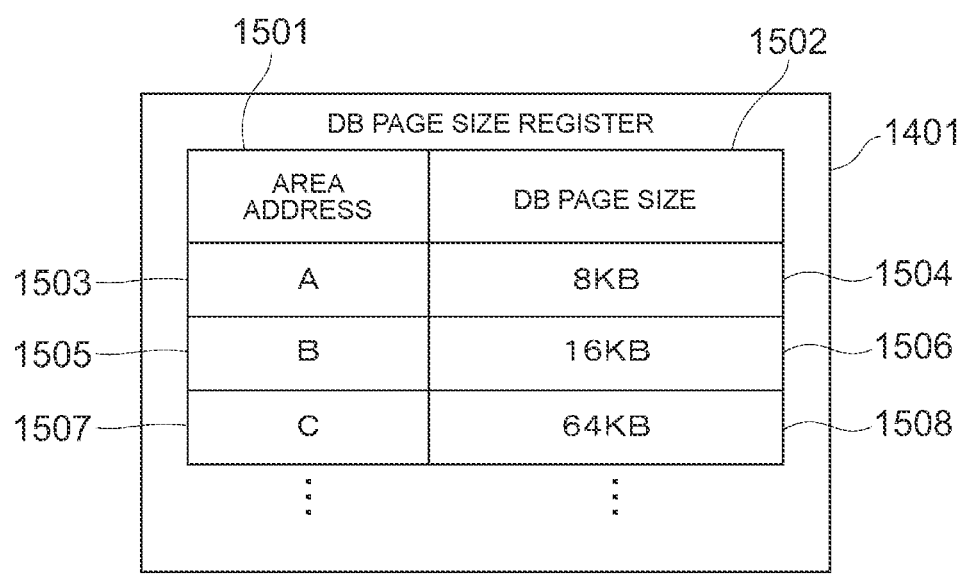
FIG. 15 is a configuration diagram of a database page size table.

FIG. 15 is a configuration diagram of a database page size table. In FIG. 15, the database page size table 1401 is a size table for recording the relationship of an area address which is added to the search request from the host CPU 101 and identifies the storage destination of the search source data, and a plurality of page sizes corresponding to different page units, and is configured from an area address field 1501 and a database page size field 1502.

The area address is an identifier which is added to the search request and identifies the storage destination of the search source data. The respective items 1503, 1505, 1507 of the area address field 1501 store information (A, B, C, . . . ) indicating the area address. The database page size is information for identifying the page size of the database. The respective items 1504, 1506, 1508 of the database page size field 1502 store, for example, information of "8 KB" as information related to the database size. Parallel operation is enabled even in cases where the page size of a plurality of databases is different by separating and setting the area regarding the base size of a plurality of data.

A case where, for example, the search source data requested in the search request is data designated based on a plurality of area addresses A, B is now explained.

When data is written, the host CPU 101 sets the relationship of the area address which identifies the storage destination of the search source data and a plurality of page sizes corresponding to different page units, and the database data is compressed by the data compression circuit 114 in these areas and stored in the flash memory 109 via the flash controller 108. Here, since data is compressed after being divided into the size set as the area according to the setting of the database page size table 1401, data decompression is enabled for each such size upon executing the search.

Upon executing the search, the management CPU 105 refers to the database page size table 1401, gives an instruction to each flash controller 108 to read the search source data identified based on the area addresses A, B, and each flash controller 108 refers to the database page size table 1401 and reads from each flash memory 109, in parallel, a plurality of compressed data belonging to the search source data identified based on the area addresses A, B and which have different page sizes (page units), for example, compressed data of 8 KB and compressed data of 16 KB, and transfers the read compressed data to the data buffer 107.

After confirming that the compressed data of 8 KB and the compressed data of 16 KB have been respectively stored in the data buffer 107, the management CPU 105 transfers the compressed data of 8 KB and the compressed data of 16 KB to each data decompression circuit 110. Each data decompression circuit 110 refers to the database page size table 1401 and deems that base size=decompression unit, and one data decompression circuit 110 decompresses the compressed data of 8 KB in a decompression unit of 8 KB and transfers the decompressed data as data of 8 KB to the data search circuit 111, and the other data decompression circuit 1110 decompresses the compressed data of 16 KB in a decompression unit of 16 KB and transfers the decompressed data as data of 16 KB to the data search circuit 111. Each data search circuit 111 refers to the database page size table 1401 and deems that base size=search unit, and one data search circuit 111 searches for the data to be searched with the data of 8 KB as the data to be searched, and the other data search circuit 111 searches for the data to be searched with the data of 16 KB as the data to be searched.

According to this embodiment, in addition to being able to yield the same effects as Embodiment 1, it is possible to execute, in parallel, data decompression/search processing to the data that was requested in the search request even in cases where the page size of a plurality of databases is different by separating and setting the area regarding the base size of a plurality of data.

Embodiment 3

Figure 16:
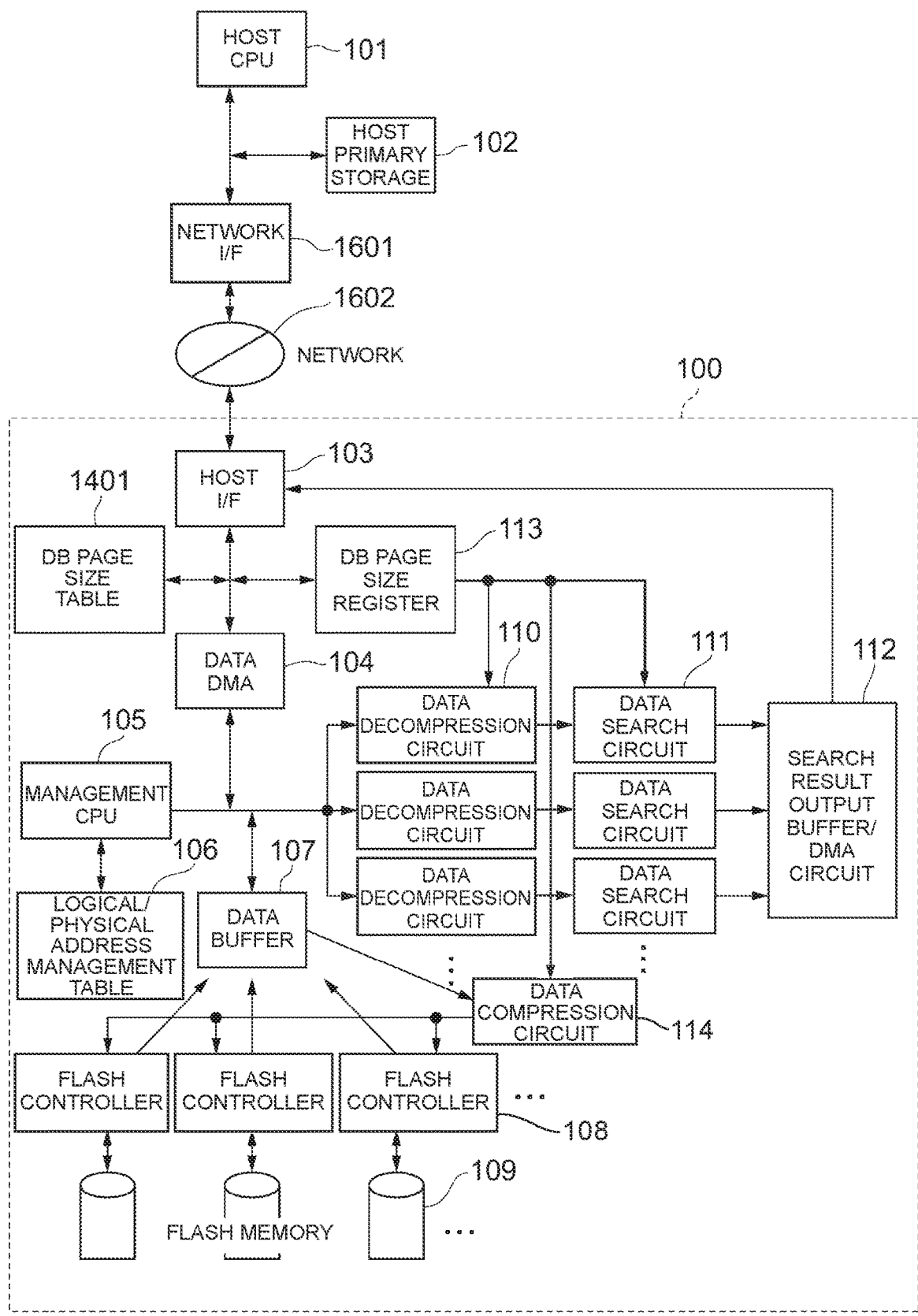
FIG. 16 is a configuration diagram of a storage system including a database assisted storage apparatus.

FIG. 16 is a configuration diagram of a storage system including a database assisted storage apparatus. In FIG. 16, the storage system is configured by connecting the storage apparatus 100 and the host CPU 101 via a network interface 1601 and a network 1602, and the configuration of the storage apparatus 100 is the same as Embodiment 2.

In this embodiment, even when the storage apparatus 100 is connected to the host CPU 101 via the network 1602 and the network interface 1601, the storage apparatus 100 can execute data decompression processing and data search processing according to information of the page size recorded in the database page size register 111 or the database page size table 1401.

According to this embodiment, the same effects as Embodiment 1 and Embodiment 2 can be yielded even when the storage apparatus 100 is connected to the host CPU 101 via the network 1602 and the network interface 1601.

Note that the present invention is not limited to the embodiments described above, and also covers various modified examples. For example, it is also possible to use a controller having the functions of the management CPU 105 and each flash controller 108, and which controls the I/O of data to and from the data buffer 107 and each flash memory 109 with a controller which governs the control of the overall storage apparatus 100. Furthermore, the foregoing embodiments were described in detail for explaining the present invention in an easy-to-understand manner, and the present invention is not necessarily limited to the configurations comprising all of the components. Moreover, a part of the configuration of a certain embodiment may be replaced with the configuration of another embodiment, and the configuration of a certain embodiment may be added to the configuration of another embodiment. Moreover, a different configuration may be added to, deleted from or replaced with a part of the configuration of the respective embodiments.

Moreover, a part or all of the respective configurations, functions, processing units and processing means described above may be realized with hardware such as by designing integrated circuits. Moreover, the respective configurations and functions described above may also be realized with software by a processor interpreting and executing the programs that realize the respective functions. Information such as programs, tables and files for realizing the respective functions may be recorded and stored in a storage device such as a memory, a hard disk, or an SSD (Solid State Drive), or in a recording medium such as an IC (Integrated Circuit) card, an SD (Secure Digital) memory card, or a DVD (Digital Versatile Disc).

REFERENCE SIGNS LIST 100 storage apparatus, 101 host CPU, 102 host primary storage device, 103 host interface, 104 data DMA circuit, 105 management CPU, 106 logical/physical address management table, 107 data buffer, 108 flash controller, 109 flash memory, 110 data decompression circuit, 111 data search circuit, 112 search result output buffer/output DMA circuit, 113 database page size register, 114 data compression circuit, 201 database page size register, 301 logical address item, 302 flash memory block address item, 303 database page data, 304 flash memory, 305 flash memory block storing two logical address data, 306 flash memory block storing one logical address data in two blocks, 307 flash memory block storing two logical address data in one block, 308 flash memory block storing one logical address data in two blocks, 401 compressed data buffer, 402 database page buffer, 403 search result buffer, 404 result DMA buffer, 501 compressed data decompression circuit, 502 check code confirmation circuit, 601 data match comparison circuit, 602 data match result buffer, 603 data segmentation circuit, 701 comparative data segmentation circuit, 702 segmentation position register, 703 comparison key register, 704 comparison key selection circuit, 705 comparator, 706 key match storage register, 707 comparison key logical register, 708 logical operation circuit, 801 data read circuit, 802 segmentation position register, 803 data position packing circuit, 901 database page, 902 database page header, 903 line 1 data, 904 line 2 data, 905 database page footer, 906 line 1 pointer, 907 line 2 pointer, 908 line header, 909 column 1 data, 910 column 2 data, 911 last column data, 912 header check code part, 913 header and other information, 914 footer check code part, 915 footer and other information, 1001 line 1 header, 1002 line 1, column 1 data, 1003 line 1, column 2 data, 1004 line 1, column 2 data, 1005 line 2 header, 1006 line 2, column 1 data, 1007 line 2, column 2 data, 1008 2 line, 2 column data, 1009 column 1 segmentation position register, 1010 column 2 segmentation position register, 310 part three of compressed data in flash memory, 1304 part one of compressed data read into data buffer, 1305 part two of compressed data read into data buffer, 1306 part three of compressed data read into data buffer, 1401 database page size table.

The invention claimed is:

1. A storage apparatus, comprising:
a plurality of flash memories which store a plurality of compressed data having different data sizes;
a flash controller which controls I/O to and from the flash memories;
a data buffer which temporarily stores the compressed data read from the flash memories by the flash controller;
a management controller which controls I/O to and from the data buffer and controls activation of the flash controller based on a search request from a search request source;
a data decompression engine which includes a plurality of data decompression circuits that decompress the compressed data transferred from the data buffer; and
a data search engine which includes a plurality of data search circuits for searching, in parallel, for data which satisfies search conditions requested in the search request among the decompressed data from each of the plurality of data decompression circuits, and transfers, to the search request source, the data obtained in the search performed by each of the data search circuits,
wherein the management controller is configured to:
instruct the flash controller to read the compressed data having different data sizes and corresponding to search source data that is requested in the search request from the search request source,
wherein the flash controller is configured to:
simultaneously begin reading the compressed data having different data sizes and corresponding to the search source data according to an instruction given by the management controller from two or more flash memories among the plurality of flash memories in parallel, and sequentially store the read compressed data having different data sizes in the data buffer in order of respective sizes thereof, and
wherein the management controller is further configured to:
sequentially transfer the compressed data from the data buffer to the plurality of data decompression circuits of the data decompression engine in order of when the compressed data corresponding to the search source data are respectively and entirely stored in the data buffer by the flash controller.

2. The storage apparatus according to claim 1, wherein each of the plurality of data decompression circuits:
decompresses the sequentially transferred compressed data in decompression units corresponding to page units of a database,
wherein each of the plurality of data search circuits:
searches for the data which satisfies the search conditions requested in the search request among the decompressed data in a respective one of the decompression units, and
wherein the management controller is further configured to:
sequentially transfer a respective one of the compressed data to one of the data decompression circuits upon the respective one of the compressed data corresponding to the search source data being entirely stored in the data buffer.

3. The storage apparatus according to claim 1, wherein a size table is included in the search request and records a relationship of an area address for identifying a storage destination of the search source data and a plurality of page sizes corresponding to different page units of a database,
wherein each of the plurality of data decompression circuits:
decompresses one of the sequentially transferred compressed data in a decompression unit corresponding to one of the page sizes recorded in the size table,
wherein each of the plurality of data search circuits:
searches for the data which satisfies the search conditions requested in the search request among data of each search unit with data of each decompression unit which were decompressed by each of the plurality of data decompression circuits as data of a search unit corresponding to one of the page sizes recorded in the size table, and
wherein the management controller is further configured to:
sequentially transfer a respective one of the compressed data to one of the data decompression circuits upon the respective one of the compressed data corresponding to the search source data being entirely stored in the data buffer.

4. The storage apparatus according to claim 1, further comprising:
a first register which stores information that is set by the search request source and which is information in a decompression unit corresponding to a page unit of a database; and
a second register which stores information that is added to the search request from the search request source and which is information indicating the search conditions requested in the search request,
wherein the data decompression engine includes:
a compressed data buffer configured to store two or more of the compressed data transferred from the data buffer,
wherein each of the plurality of data decompression circuits:
decompresses the compressed data stored in the compressed data buffer in a decompression unit corresponding to the page unit stored in the first register,
wherein each of the plurality of data search circuits:
searches for data which satisfies the search conditions stored in the second register among the decompressed data of each decompression unit,
wherein the data search engine includes:
a search result output circuit which compiles and stores the search results of each of the data search circuits, and transfers the collectively stored contents to the search request source, and
wherein the management controller is further configured to:
sequentially transfer a respective one of the compressed data to one of the data decompression circuits upon the respective one of the compressed data corresponding to the search source data being entirely stored in the data buffer.

5. The storage apparatus according to claim 1,
wherein each of the flash memories includes a plurality of blocks for storing data, and each of the plurality of blocks stores, for each page unit of a database, a respective one of the compressed data obtained by compressing data in which a data size before data compression is managed in page units of the database.

6. A data processing method of processing data of a storage apparatus according to a search request from a search request source, comprising:
a plurality of flash memories which store a plurality of compressed data having different data sizes;
a flash controller which controls I/O to and from the flash memories;
a data buffer which temporarily stores the compressed data read from the flash memories by the flash controller;
a management controller which controls I/O to and from the data buffer and controls activation of the flash controller based on the search request from the search request source;
a data decompression engine which includes a plurality of data decompression circuits that decompress the compressed data transferred from the data buffer; and
a data search engine which includes a plurality of data search circuits for searching, in parallel, for data which satisfies search conditions requested in the search request among the decompressed data from each of the plurality of data decompression circuits, and transfers, to the search request source, the data obtained in the search performed by each of the data search circuits,
wherein the data processing method comprises:
a first step of the management controller instructing the flash controller to read the compressed data having different data sizes and corresponding to search source data that is requested in the search request from the search request source;
a second step of the flash controller simultaneously beginning reading the compressed data having different data sizes and corresponding to the search source data according to an instruction given by the management controller from two or more flash memories among the plurality of flash memories in parallel, and sequentially storing the read compressed data having different data sizes in the data buffer in order of respective sizes thereof; and
a third step of the management controller of sequentially transferring the compressed data from the data buffer to the plurality of data decompression circuits of the data decompression engine in order of when the compressed data corresponding to the search source data are respectively and entirely stored in the data buffer.

7. The data processing method according to claim 6,
wherein each of the plurality of data decompression circuits:
decompresses the sequentially transferred compressed data in decompression units corresponding to page units of a database,
wherein each of the plurality of data search circuits:
searches for the data which satisfies the search conditions requested in the search request among the decompressed data in a respective one of the decompression units, and
wherein the management controller:
in the third step, sequentially transfers a respective one of the compressed data to one of the data decompression circuits upon the respective one of the compressed data corresponding to the search source data being entirely stored in the data buffer.

8. The data processing method according to claim 6,
wherein a size table is included in the search request and records a relationship of an area address for identifying a storage destination of the search source data and a plurality of page sizes corresponding to different page units of a database,
wherein each of the plurality of data decompression circuits:
decompresses one of the sequentially transferred compressed data in a decompression unit corresponding to one of the page sizes recorded in the size table,
wherein each of the plurality of data search circuits:
searches for the data which satisfies the search conditions requested in the search request among data of each search unit with data of each decompression unit which were decompressed by each of the plurality of data decompression circuits as data of a search unit corresponding to one of the page sizes recorded in the size table, and
wherein the management controller:
in the third step, sequentially transfers a respective one of the compressed data to one of the data decompression circuits upon the respective one of the compressed data corresponding to the search source data being entirely stored in the data buffer.

9. The data processing method according to claim 6, the storage apparatus further comprising:

a first register which stores information that is set by the search request source and which is information in a decompression unit corresponding to a page unit of a database; and a second register which stores information that is added to the search request from the search request source and which is information indicating the search conditions requested in the search request, wherein the data decompression engine includes:

a compressed data buffer configured to store two or more of the compressed data transferred from the data buffer, wherein each of the plurality of data decompression circuits:

decompresses the compressed data stored in the compressed data buffer in a decompression unit corresponding to the page unit stored in the first register, wherein each of the plurality of data search circuits:

searches for data which satisfies the search conditions stored in the second register among the decompressed data of each decompression unit, wherein the data search engine includes:

a search result output circuit which compiles and stores the search results of each of the data search circuits, and transfers the collectively stored contents to the search request source, and wherein the management controller:

in the third step, sequentially transfers a respective one of the compressed data to one of the data decompression circuits upon the respective one of the compressed data corresponding to the search source data being entirely stored in the data buffer.

10. The data processing method according to claim 6, wherein each of the flash memories includes a plurality of blocks for storing data, and each of the plurality of blocks stores, for each page unit of a database, a respective one of the compressed data obtained by compressing data in which a data size before data compression is managed in page units of the database.

11. A storage system, comprising:

a host computer which issues a search request; and a storage apparatus which is connected to the host computer via a network and which sends and receives information to and from the host computer via the network, wherein the storage apparatus comprises:

a plurality of flash memories which store a plurality of compressed data having different data sizes;

a flash controller which controls I/O to and from the flash memories;

a data buffer which temporarily stores the compressed data read from the flash memories by the flash controller;

a management controller which controls I/O to and from the data buffer and controls activation of the flash controller based on the search request from the host computer;

a data decompression engine which includes a plurality of data decompression circuits that decompress the compressed data transferred from the data buffer; and a data search engine which includes a plurality of data search circuits for searching, in parallel, for data which satisfies search conditions requested in the search request among the decompressed data from each of the plurality of data decompression circuits, and transfers, to the host computer, the data obtained in the search performed by each of the data search circuits, wherein the management controller is configured to:

instruct the flash controller to read the compressed data having different sizes and corresponding to search source data that is requested in the search request from the host computer, wherein the flash controller is configured to:

simultaneously begin reading the compressed data having different sizes and corresponding to the search source data according to an instruction given by the management controller from two or more flash memories among the plurality of flash memories in parallel, and sequentially store the read compressed data in the data buffer sequentially in order of respective sizes thereof, and wherein the management controller is further configured to:

sequentially transfer the compressed data from the data buffer to the plurality of data decompression circuits of the data decompression engine in order of when the compressed data corresponding to the search source data are respectively and entirely stored in the data buffer by the flash controller.

12. The storage system according to claim 11, wherein each of the plurality of data decompression circuits:

decompresses the sequentially transferred compressed data in decompression units corresponding to page units of a database, wherein each of the plurality of data search circuits:

searches for the data which satisfies the search conditions requested in the search request among the decompressed data in a respective one of the decompression units, and wherein the management controller is further configured to:

sequentially transfer a respective one of the compressed data to one of the data decompression circuits upon the respective one of the compressed data corresponding to the search source data being entirely stored in the data buffer.

13. The storage system according to claim 11, wherein a size table is included in the search request and records a relationship of an area address for identifying a storage destination of the search source data and a plurality of page sizes corresponding to different page units of a database, wherein each of the plurality of data decompression circuits:

decompresses one of the sequentially transferred compressed data in a decompression unit corresponding to one of the page sizes recorded in the size table, wherein each of the plurality of data search circuits:

searches for the data which satisfies the search conditions requested in the search request among data of each search unit with data of each decompression unit which were decompressed by each of the plurality of data decompression circuits as data of a search unit corresponding to one of the page sizes recorded in the size table, and wherein the management controller is further configured to:

sequentially transfer a respective one of the compressed data to one of the data decompression circuits upon the respective one of the compressed data corresponding to the search source data being entirely stored in the data buffer.

14. The storage system according to claim 11, further comprising:

a first register which stores information that is set by the host computer and which is information in a decompression unit corresponding to a page unit of a database; and a second register which stores information that is added to the search request from the host computer and which is information indicating the search conditions requested in the search request, wherein the data decompression engine includes:

a compressed data buffer configured to store two or more of the compressed data transferred from the data buffer, wherein each of the plurality of data decompression circuits:

decompresses the compressed data stored in the compressed data buffer in a decompression unit corresponding to the page unit stored in the first register, wherein each of the plurality of data search circuits:

searches for data which satisfies the search conditions stored in the second register among the decompressed data of each decompression unit, wherein the data search engine includes:

a search result output circuit which compiles and stores the search results of each of the data search circuits, and transfers the collectively stored contents to the host computer, and wherein the management controller is further configured to:

sequentially transfer a respective one of the compressed data to one of the data decompression circuits upon the respective one of the compressed data corresponding to the search source data being entirely stored in the data buffer.

15. The storage system according to claim 11, wherein each of the flash memories includes a plurality of blocks for storing data, and each of the plurality of blocks stores, for each page unit of a database, a respective one of the compressed data obtained by compressing data in which a data size before data compression is managed in the page unit of the database.

* * * * *